(12) United States Patent
Anjum et al.

(10) Patent No.: US 7,933,237 B2
(45) Date of Patent: Apr. 26, 2011

(54) ENSURING QUALITY OF SERVICE OF COMMUNICATIONS IN NETWORKS

(75) Inventors: Farooq Anjum, Somerset, NJ (US); Latha Kant, Basking Ridge, NJ (US); Alexander Poylisher, Brooklyn, NY (US); Ritu Chadha, Hillsborough, NJ (US)

(73) Assignee: Telcordia Licensing Company, LLC, Piscataway, NJ (US)

( * ) Notice: Subject to any disclaimer, the term of this patent is extended or adjusted under 35 U.S.C. 154(b) by 1054 days.

(21) Appl. No.: 11/645,451

(22) Filed: Dec. 26, 2006

(65) Prior Publication Data
US 2010/0034138 A1 Feb. 11, 2010

Related U.S. Application Data

(60) Provisional application No. 60/753,799, filed on Dec. 23, 2005.

(51) Int. Cl.
*H04W 4/00* (2009.01)

(52) U.S. Cl. ........ 370/328; 370/220; 370/230; 370/229; 370/235.1; 370/236.1; 455/446

(58) Field of Classification Search .................. 370/220, 370/328, 229–234, 235.1, 236.1, 236; 455/446
See application file for complete search history.

(56) References Cited

U.S. PATENT DOCUMENTS

| | | | | |
|---|---|---|---|---|
| 5,521,971 A | * | 5/1996 | Key et al. | 379/221.07 |
| 5,646,943 A | * | 7/1997 | Elwalid | 370/230 |
| 5,719,854 A | | 2/1998 | Choudhury et al. | |
| 5,758,076 A | * | 5/1998 | Wu et al. | 709/231 |
| 5,845,279 A | | 12/1998 | Garofalakis et al. | |
| 5,920,571 A | | 7/1999 | Houck et al. | |
| 6,021,263 A | * | 2/2000 | Kujoory et al. | 709/232 |
| 6,041,239 A | | 3/2000 | Reed et al. | |
| 6,081,513 A | | 6/2000 | Roy | |
| 6,215,772 B1 | | 4/2001 | Verma | |
| 6,317,584 B1 | | 11/2001 | Abu-Amara et al. | |
| 6,738,819 B1 | | 5/2004 | Li et al. | |
| 6,757,540 B1 | * | 6/2004 | Lehtinen | 455/446 |
| 6,956,821 B2 | | 10/2005 | Szviatovszki et al. | |
| 7,257,083 B2 | | 8/2007 | Bansal et al. | |
| 7,315,514 B2 | * | 1/2008 | Heiner et al. | 370/230 |

(Continued)

OTHER PUBLICATIONS

J.J. More, "The Levenberg-Marquardt algorithm: Implementation and theory", Lecture Notes in Mathematics 630: Numerical Analysis, G.A. Watson (Ed.), Springer, pp. 105-116, 1975. 12 pages.

(Continued)

*Primary Examiner* — Charles Shedrick
(74) *Attorney, Agent, or Firm* — Fitch Even Tabin & Flannery

(57) ABSTRACT

A method and apparatus for controlling ingress to a communications network to control quality of service is described. A request to admit a new communications flow is received. A polynomial and its coefficients representing a state of the network is determined and applied to the network state plus the new communications flow to determine whether admission of the new communications flow would cause the network to operate in a stable or unstable state. In response to determining that the network would operate in the unstable state, a communications flow for the ingress device is downgraded in its quality of service. By another approach, it is determined whether the new communications flow exceeds an allocated quota of bandwidth. Admission or rejection of the communications flow can be determined.

19 Claims, 2 Drawing Sheets

U.S. PATENT DOCUMENTS

| | | |
|---|---|---|
| 2001/0052011 A1 | 12/2001 | Nagao |
| 2002/0009092 A1 | 1/2002 | Seaman et al. |
| 2002/0129138 A1 | 9/2002 | Carter |
| 2002/0141345 A1 | 10/2002 | Szviatovszki et al. |
| 2002/0165970 A1 | 11/2002 | Ludewig |
| 2002/0181394 A1 | 12/2002 | Partain et al. |
| 2003/0072318 A1 | 4/2003 | Lam et al. |
| 2003/0152029 A1 | 8/2003 | Couturier |
| 2004/0143850 A1 | 7/2004 | Costa |
| 2004/0156313 A1 | 8/2004 | Hofmeister et al. |
| 2004/0223500 A1 | 11/2004 | Sanderson et al. |
| 2005/0002330 A1* | 1/2005 | Cave et al. .................... 370/229 |
| 2005/0002364 A1 | 1/2005 | Ozer et al. |
| 2005/0063400 A1 | 3/2005 | Lum |
| 2005/0094628 A1 | 5/2005 | Ngamwongwattana et al. |
| 2005/0117512 A1 | 6/2005 | Vasseur et al. |
| 2005/0226400 A1 | 10/2005 | Farber et al. |
| 2006/0047775 A1 | 3/2006 | Bruck et al. |
| 2006/0120282 A1 | 6/2006 | Carlson et al. |
| 2010/0011118 A1 | 1/2010 | Chang et al. |

OTHER PUBLICATIONS

S. Jamin, P. Danzig, S. Shenker, L. Zhang, "A Measurement-based Admission Control Algorithm for Integrated Services Packet Networks", IEEE/ACM Trans. on Networking, Feb. 1997. 20 pages.

L. Breslau, S. Jamin, S. Shenker, "Comments on the Performance of Measurement-Based Admission Control Algorithms", Proceedings of IEEE INFOCOM 2000, 2000. 18 pages.

S. Valaee, B. Li, "Distributed Call Admission Control for Ad Hoc Networks", Proceedings of the 56th IEEE Vehicular Technology Conference (VTC '02), vol. 2, pp. 1244-1248, 2002. 5 pages.

McCann, John C.; Elmasry, George F.; Russell, Brian; Welsh, Bob. "A Measurement-Based Approach for Multilevel Admission of Heterogeneous Traffic in Wireless Ad-hoc Networks". Proceedings of IEEE Milcom 2004. Oct. 31-Nov. 3, 2004. 4 pages.

* cited by examiner

ENSURING QUALITY OF SERVICE OF COMMUNICATIONS IN NETWORKS

CROSS REFERENCE TO RELATED APPLICATION

This application claims the benefit of U.S. Provisional Patent Application No. 60/753,799 filed Dec. 23, 2005, the disclosure of which is hereby incorporated herein by reference.

GOVERNMENT LICENSE RIGHTS

This invention was made with Government support under W15P7T-04-C-P604 awarded by the US Army Communications-Electronics Command (CECOM). The Government has certain rights in this invention.

FIELD OF THE INVENTION

The present invention relates generally to the field of wireless networking and more specifically the field of managing the Quality of Service in converged wireless networks.

BACKGROUND OF THE INVENTION

Quality of service is defined as the capability of the network to transport information across the network while satisfying some communication performance requirements of applications, such as low delay, low loss, or high throughput. Given the reality that the amount of traffic to be sent over a network may exceed its capacity, any QoS mechanism must also be capable of providing different levels of QoS to different types of traffic in accordance with externally specified policies related to priority (also referred to as Class of Service). Providing end-to-end (E2E) QoS assurances in a converged network is indeed a challenging task.

Converged networks mean a combination of diverse networks over which services are provided. Diversity is with respect to the organizations that control the networks. In addition, it is assumed that an organization has no control over networks that do not belong to it. Thus, the challenge for an organization lies in providing QoS for flows that traverse networks that are not under the control of that organization. Such networks which are not under the control of that organization are called opaque networks. This also implies that the organization cannot expect to know directly of the state of the opaque network or networks but instead will have to infer their state, and using this inference, the organization will have to depend on mechanisms to ensure QoS for the flows. Such converged networks are expected to transport a wide spectrum of applications each with very diverse QoS requirements. These challenges have inspired a number of approaches in the prior art.

One such approach describes using "time-delay" measurements to describe the characteristics of opaque networks. In addition the approach is based on active probes. (S. Valaee & B. Li, "Distributed call admission control for ad hoc networks", published in the proceedings of the VTC'02). While this is a good approach for certain types of networks, it suffers from the following severe drawbacks: (a) It is expensive in terms of the "overheads" introduced in order to derive latency estimates, (b) it is limited to wireline networks, and (c) it does not consider multiple service (traffic) classes. Hence such an approach, albeit good for the environments that it has been proposed for, cannot be used (nor extended without having to undergo major transformations) to solve the problems associated with such converged networks.

Others considered measurement based admission control (MBAC). MBAC schemes use measurements to characterize the current load. Such algorithms have been shown to achieve much higher utilization than parameter-based admission control algorithms (S. Jamin, P. Danzig, S. Shenker and L. Zhang, "A measurement based admission control algorithm for integrated services packet networks", IEEE/ACM Trans. on Networking, 5, Feb. 1997. 56-70). L. Breslau and S. Jamin and S. Shenker in "Comments on the performance of measurement-based admission control algorithms", Infocom 2000, have shown that different MBAC algorithms all achieve almost identical levels of performance. These MBAC algorithms still however suffer from the requirement of complete knowledge and control over the elements in the path of the data packets.

It is therefore an object of the invention to provide methods and systems for use in network management systems for converged wireless networks that can better provide/sustain QoS assurances to the wide spectrum of applications that use such converged networks that overcome the deficiencies in the prior art.

SUMMARY OF THE INVENTION

The invention is a method and system for providing QoS over networks that do not provide any information and only serve to carry packets (i.e. opaque networks). Specifically, as traffic traverses between various user networks via the opaque network, gateways at the edge of the user networks keep a record of the packets traversing into the opaque network and packets traversing out of the opaque network. These gateways also know about the traffic classes that each of these packets belong to. The gateways at the ingress (the user network where the packets originate) and the gateways at the egress (the user network where the packets terminate) coordinate amongst themselves to exchange information about the number and latency of packets exchanged between the two. This information is used by the gateway at the ingress user network to estimate the state of the opaque network. Admission control and quality control is then based on this estimated state of the opaque network. In a preferred embodiment, the state of the network is estimated and updated based on throughput traffic over the opaque network using a technique known as dynamic throughput graphs.

DETAILED DESCRIPTION OF THE INVENTION

Figure 1:
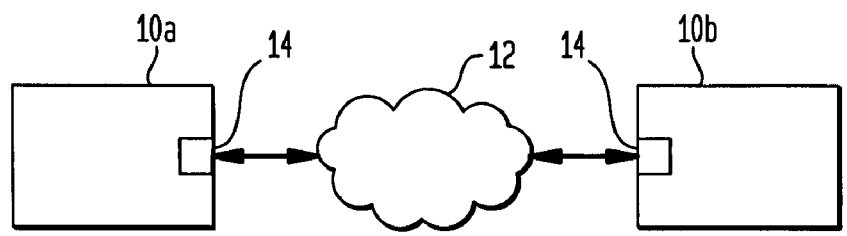
FIG. 1 depicts the network to which the invention would be applicable.

The invention is best understood with an overview of the network depicted in FIG. 1. The invention is a method and system for providing Quality of Service (QoS) over networks that do not provide any information and only serve to carry packets. Specifically, as traffic traverses between various user networks 10a and 10b via the opaque network 12, gateways at the edge 14 of the user networks keep a record of the packets traversing into the opaque networks 12 and packets traversing out of the opaque networks. These gateways 14 also know about the traffic classes that each of these packets belong to. The gateways at the ingress user network 10*a* (the user network where the packets originate) and the gateways at the egress user network 10*b* (the user network where the packets terminate) coordinate amongst themselves to exchange information about the number and latency of packets exchanged between the two. This information is used by the gateway 14 at the ingress user network 10*a* to estimate the state of the opaque network. Admission control and quality control is then based on this estimated state of the opaque network.

Figure 2:
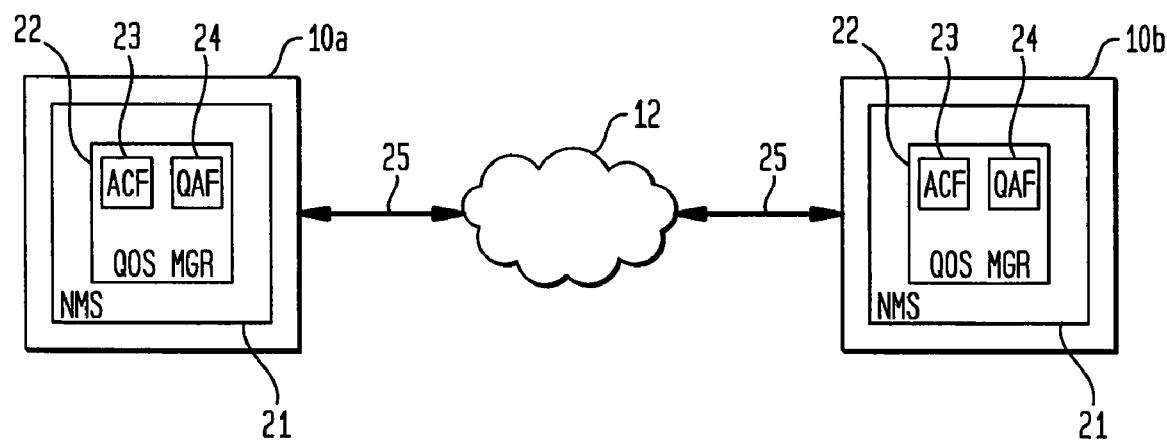
FIG. 2 illustrates the functional components of the inventive solution.

FIG. 2 illustrates the functional solution architecture of the invention. The invention is a Network Managements System (NMS) 21 within a user network 10*a* and 10*b* with a QoS Management Function 22 having two key functional components. One component is a light weight admission control function (ACF) 23 that judiciously admits applications when resource contentions arise and the second is a QoS Adjustment Function (QAF) 24 that helps sustain QoS assurances amidst network resource fluctuations. The Admission Control Function (ACF) 23 is responsible for deciding if a flow request can be admitted into the opaque network 12 by the QoS Management Function 22. The QoS Adjustment Function 24 is responsible for preempting existing lower priority flows 25 if there is insufficient bandwidth to admit a higher priority flow; preempting flows whose duration have expired; and preempting existing flows if the network throughput deteriorates beyond a configurable threshold. In addition to the ACF and the QAF that are located within a NMS, the invention may include a QoS agent. This QoS Agent implements a QoS request, and is responsible for configuring, marking, and policing rules. It also collects outgoing and incoming traffic measurements, and reports the measurements to the QoS Management Function.

The invention further involves measuring the throughput through an opaque network at the ingress-egress pairs for each class of service and storing the results in the form of throughput graphs. These throughput graphs provide information on the state of the opaque network. The throughput graphs are updated based on recording byte counts over configurable time samples at the ingress-egress ports.

Figure 3:
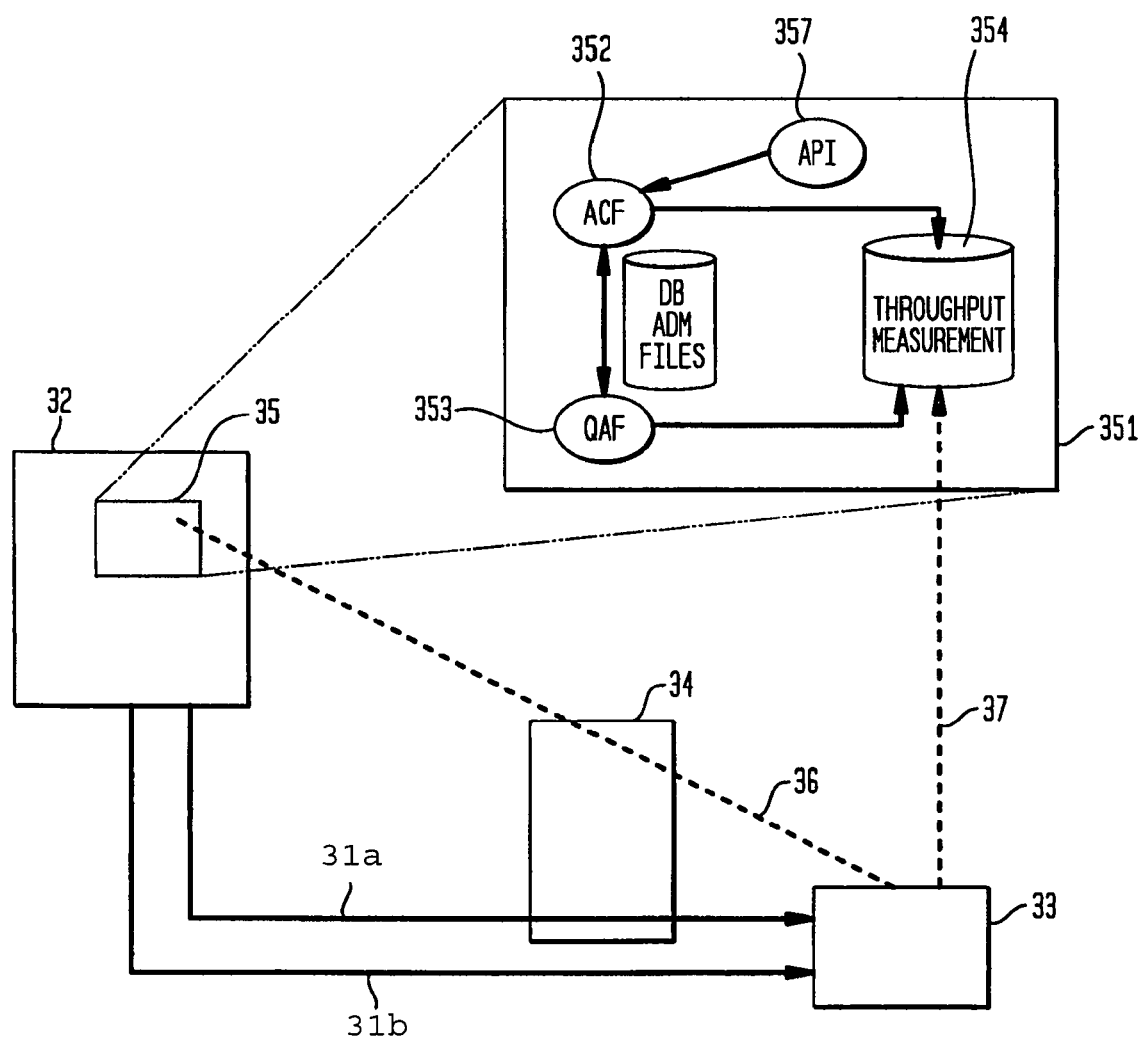
FIG. 3 illustrates the operation of the QoS Adjustment Function using Dynamic Throughput Graphs in accordance with the invention.

The invention can best be understood by the description below of the method explained in light of FIG. 3.

Initially a flow belonging to class 1 starts 31*a* from user network 32 to user network 33 through opaque network 34. FIG. 3 illustrates a NMS function 35 within user network 32. The NMS Management Function 35 is also shown in expanded form 351 in FIG. 3. At that time assume that the ACF function 352 at the ingress point does not have any history to base its decision on. In that case ACF 352 decides to admit the flow 31*a* into the network 34. The QoS function at the egress point 33 will send a report 37 at the end of the reporting interval about the number of bytes received in the reporting interval to update the throughput management databases 354. The ingress QoS function 35 stores this information. The process continues. If a flow belonging to another class 31*b* starts in the meantime, then the same process is applied to that. As a result the QoS function 35 at the ingress 32 is able to construct the output bytes versus time window. There exists one such window for every class of flow that originates at node 32. Note that every point corresponds to a report obtained every reporting interval. When this window has adequate number of data points, the QoS function 35 goes to the next step. Note that the QoS function also has the data about the number of bytes allowed into the network in every reporting interval.

In step 2 the QoS function determines the polynomials that describe the network functioning based on the input and output data gathered for this window of data. Thus techniques like multivariate regression can be used and using the data the various parameters of these polynomials estimated. Initially the coefficients of each of the polynomials are assumed to be zero since there are no flows belonging to those classes.

The ACF function 352 at the ingress 32 can then use the polynomial coefficients to make its decisions. Assume that a new flow comes in that belongs to class 1. Further, let i1 denote the current input bytes of class 1 and let the bandwidth requirement of the new flow correspond to e bytes in the next interval. Similarly let i2 and o2 denote the input and output bytes (in a reporting interval) corresponding to class 2 at the point the request for new flow comes in. Then the ACF function 352 determines the output bytes of class 1 if the input bytes are i1+e. This determination can be done based on the computed polynomials. Let o1c denote the computed output for class 1. In this case the flow is admitted if the ratio of o1c by i1+e does not violate the packet loss guarantees given for this class. For example if class 1 consists of only VoIP traffic then a 5% packet loss is tolerable. If this is not the case then the flow is not admitted in the chosen class but can be accepted as best effort flow.

The functioning of the QAF will now be explained. While this explanation considers only two classes, the concept is easily extensible to more than two classes. It is assumed that bootstrapping is done and hence the polynomial description of the network state is accessible. As earlier, i1 denotes the input bytes in an interval for class 1, i2 for class 2 and so on. Similarly, o1 denotes the output bytes in an interval for class 1, o2 for class 2 and so on. Note that the coefficients c, d, g, and h are initially set to be zero since no flows are assumed for classes three and four. The QAF function 353 gets involved at the end of every reporting interval. The QAF determines if the ratio of output bytes to the input bytes in the last time interval for a given class is less than a threshold. If this is not true for all the classes of flows that originate at this node then nothing needs to be done. But if this is true, then the QAF function decides to downgrade flows of either or both of the existing classes in this example based on policy. The QAF function uses the polynomial expressions to determine the number of sub-flows constituting the aggregate flow belonging to a given class to downgrade so that the resulting aggregate flows in both classes satisfy the threshold limits.

The egress nodes 33 send back reports at every reporting interval to all the ingress nodes 35 with which they have active flows. Each report contains information about the number of bytes received from the corresponding ingress node in the last reporting interval. The QoS function 35 at the ingress node periodically uses these reports to calculate the coefficients of the polynomials and create dynamic throughput graphs (DTG) which are stored in the throughput measurements database 354. Then the values of the old and the new coefficients are compared. A difference larger than a predetermined threshold T is indicative of a change in the underlying network state. This is assumed to point to a regime change. In such a case the new polynomials are used by both the ACF 352 and the QAF 353 to make their decisions. A threshold T has to be selected intelligently so that the network does not exhibit hysteresis. Note though that for networks which are static or for networks whose mobility pattern is not expected to change, the value of T becomes immaterial since the network will not exhibit regime change. More specifically, on receiving the periodic usage measurement (report), the QoS manager 35 at a node will first identify if there has been a regime change.

Upon determination of the appropriate regime, the next step is to use the packets sent/received information to update the DTG if needed. A multi-class DTG for an ingress-egress pair and a regime is defined as a function of n variables and whose value is a vector of size n as shown below:

$$[i_1, i_2, \ldots, i_n] = DTG_f(o_1, o_2, \ldots, o_n),$$

where $o_k$ is the output (egress data rate) and $i_k$ is the input (ingress data rate) in class k. $DTG_f$ is a function which can be estimated with an n-dimensional non-linear (e.g., polynomial) least-squares fit to the measurements, based the Levenberg-Marquardt method (J J. More, *The Levenberg-Marquardt Algorithm: Implementation and Theory*, LNCS 630, 1978) implemented in a number of numerical computing libraries (e.g., GSL GNU Scientific Library (GSL)). If polynomial fit is used, the estimation results in n polynomials of n variables of a given degree d. These polynomials can then be used to compute the projected input value for a class, given the measured and/or projected values of the output for all classes (DTG query). Note that the polynomial estimations mentioned above do not have any special processing requirements.

Next, in order to compute and update the DTG, a sliding window of size $WS^1$ of the reports received by the ingress node is maintained (with a minimum of MDP reports required before a DTG is usable). All data points within the window are then used to update the DTG polynomials.

When an application flow belonging to a class needs to be started, the initiating application uses the QoS API 357 to make an admission request. On the receipt of the admission request the implementation checks for the existence of the Dynamic Throughput Graphs (DTGs). If the DTGs do not exist yet, the QoS Manager resorts to using simple rules to decide on the acceptance or rejection of the request.

For the situation where the DTGs exist, the QoS Manager, more specifically, the ACF, looks up the DTG after determining if the flows for class A (including the incoming flow) are within their quota. This assumes that every class will be allocated a quota of the bandwidth. Ideally this quota exists for every class in order to prevent starvation of lower priority classes and this applies to the entire network. But ensuring that all the flows of a class over the entire network satisfy the quota will lead to unnecessary overhead. Hence it is assumed that the quota applies to every node. Note that this is an optimistic approach. The conservative approach would be to use a small fraction of the quota as the limit on the flows of a class at a node.

Thus, the ACF at the ingress node checks if the flows of the class are within their quota. If so, ACF uses the DTGs to determine if the new state would cause network instability. A network is in the stable region if the packet loss for every class is below the allowable threshold for that class. To check if the resulting network state is in the stable region, the ACF will use the input and output data values for every class except the class of interest (class for which the admission request is made). For the class of interest, use the input load which would result if the flow is accepted and determine the output bandwidth using the DTG polynomial. Based on this, the stability of the network can be decided. This is the same as explained earlier.

If the network is expected to be stable in the new state then the flow request will be accepted. On the other hand, if the new state would cause the network to operate in the unstable regime then the QoS Manager (the ACF in this case) needs to identify whether the flows of any class are exceeding their quota. If such a class exists then one or more flows (either randomly chosen or chosen based on mission priority values) from the class will be downgraded. If such a class (flows of which exceed the quota) does not exist then the decision to either accept the new flow request or reject it can be made based on policy. Note that such a class can exist given that the network state is affected by flows from all the nodes. Note that a policy which decides to accept the flow even when such a class does not exist can be considered aggressive. The intention here is to maintain high network utilization as long as QoS assurances (within some tolerance ranges) are sustained. On the other hand, if the policy emphasizes QoS over network utilization then the ACF would reject the flow when such a class does not exist (even though flows of the class do not exceed their quota at the ingress node). This would be a conservative strategy.

Finally, if the flows of the class corresponding to the flow for which the new request is made exceed their quota at the ingress node, then the ACF checks to see if the resulting state would be in the stable region. The flow is accepted if so and rejected otherwise. Note that a rejected flow is expected to proceed as a BE flow.

To summarize, the admission control algorithm is given as:

---

1. When an admission request is made for class A
   a. If the DTGs exists, then lookup the appropriate DTG for the flow's destination.
      i. If the flows for class A are within their quota, then
         1. if the resulting network state would be in the stable region, accept the flow request for the given class and do nothing for the other classes
         2. else (if the resulting state will not be in the stable region), accept the flow request for the given class but then
            a. identify the class exceeding its quota and flows of the class exceeding their quota if any such flows exist and downgrade one or more flows from this class based on mission priority.
            b. (depending on downgrading policy) If such flows do not exist, then downgrade flows belonging to a lower priority class if such a class exists. If such a lower priority class does not exist then do nothing more (after accepting the flow request)
      ii. If not (flows of class A not in quota) then check to see if the resulting network state would be in the stable region
         1. if so, accept the flow
         2. if not (network state not in stable region), then reject the flow request for the given class.
   b. else (DTG does not exist)
      i. Accept the request if the basic (simple) rules allow.
      ii. Reject the request otherwise.

---

Once a flow has been admitted, the system would need to keep on monitoring the network. This is to provide for adjustment in the QoS, which could be needed as network conditions change. Note that the quality adjustment function is quite important given the dynamic nature of the FCS networks. The quality adjustment function for the multi-class case will now be considered.

The QAF depends on periodic usage reports/measurements being sent by every egress node to the ingress node. These periodic usage reports/measurements are stored in a "throughput measurements" database 354. The DTGs are updated periodically by an updating function built to work with the "throughput measurements" database, on receipt of a periodic report. With a lower periodicity, the QAF checks if the network is in the stable region using the appropriate DTG. Based on the DTG, if the network condition is determined to be stable the QAF does not need to do anything.

On the other hand if the network is not in the stable regime the QAF will have to identify and downgrade flows so that the network can be brought back to the stable region. Several downgrading policies are possible. In one, the search for flows to be downgraded is restricted to the class for which instability is detected. In another, an order of class priorities is assumed and the search starts with the class having a priority higher than BE and work upwards towards the class in which instability is detected. In each class the QAF will identify the flows to downgrade. The QAF will stop as soon as an adequate number of flows have been identified. The resultant network state can then be expected to be in the stable regime.

It should be noted that network stability is considered in terms of packet losses only. It should also be noted that a flow is assumed to be downgraded to the best efforts (BE) class only, and that automated upgrades are not desirable (instead, it is left to applications to re-request QoS).

To summarize, the multi-class QAF algorithm is given as:

---

On the receipt of a periodic report:
    The node will check if the network is in the stable region using the appropriate DTG
        If so, (network in stable regime) then nothing to be done.
        If not, (network not in stable regime) then identify and downgrade flows so as to cause the network state to operate in the stable region, according to the downgrading policy.

---

The periodic reports sent by the egress nodes are used by the measurement update functionality to produce dynamic throughput graphs that capture the dynamics of the underlying FCS network as closely as possible.

What is claimed is:

1. A method comprising:
   receiving at an ingress device a request for admission of a new communications flow comprising a plurality of packets from the ingress device into a network having a stable state and an unstable state;
   determining coefficients for a polynomial representing a state of the network, the coefficients for the polynomial based at least in part on data for packets entering the network from the ingress device and exiting the network at an egress device;
   applying the polynomial with the coefficients to the new communications flow to determine whether admission of the new communications flow into the network would cause the network to operate in the stable state or the unstable state; and
   downgrading a quality of service of at least one communications flow for the ingress device in response to determining that the network is operating in the unstable state in response to introduction of the new communications flow.

2. The method of claim 1, further comprising storing the coefficients and the polynomial as a dynamic throughput graph.

3. The method of claim 1, wherein the determining coefficients for the polynomial based at least in part on the data for packets entering the network from the ingress device and exiting the network at an egress device comprises determining coefficients based at least in part on a number of packets of communications flows entering the network from the ingress device and a number of the packets of the communications flows exiting the network at the egress device over a reporting interval, wherein the network comprises an opaque network.

4. The method of claim 1, further comprising updating the coefficients for the polynomial based on updated data for packets entering the network from the ingress device and exiting the network at an egress device.

5. The method of claim 1, further comprising calculating the coefficients for the polynomial using multivariate regression.

6. The method of claim 1, further comprising determining whether the new communications flow is within an allocated quota of bandwidth for the ingress device.

7. The method of claim 6, further comprising admitting the new communications flow in response to determining that the new communications flow is within the allocated quota of bandwidth and determining that the network would operate in the stable state.

8. The method of claim 6, further comprising admitting the new communications flow in response to determining that the new communications flow is not within the allocated quota of bandwidth and determining that the network would operate in the stable state.

9. The method of claim 6, further comprising rejecting the new communications flow in response to determining that the new communications flow is not within the allocated quota of bandwidth and determining that the network would operate in the unstable state.

10. The method of claim 1, further comprising in response to determining that the network would operate in the unstable state, determining a class that exceeds its quota of bandwidth and downgrading at least one communications flow belonging to the class that exceeds its quota of bandwidth.

11. The method of claim 1, further comprising in response to determining that the network would operate in the unstable state, downgrading at least one communications flow belonging to a class based on a priority of the class.

12. The method of claim 1, further comprising rejecting the request for admission of a communications flow that exceeds its allocated quota of bandwidth in response to determining admission into the network would cause the network to operate in the unstable region.

13. An apparatus comprising:
   an ingress device configured to communicate over a network having a stable state and an unstable state, the ingress device comprising:
   a network management system configured to operate an admission control function and a quality of service adjustment function;
   wherein the admission control function is configured to determine whether a new communications flow from the ingress device into the network is within an allocated quota of bandwidth for the ingress device;
   wherein the network management system is configured to determine coefficients for a polynomial representing a state of the network, the coefficients for the polynomial based at least in part on data for packets entering the network from the ingress device and exiting the network at an egress device, wherein the network comprises an opaque network;
   wherein the network management system is configured to apply the polynomial with the coefficients to the new communications flow to determine whether admission of the new communications flow into the network would cause the network to operate in the stable state or the unstable state; and
   wherein the quality of service adjustment function is configured to downgrade a quality of service of at least one communications flow in response to the determination that the network is operating in the unstable region.

14. The apparatus of claim 13 wherein the network management system is configured to calculate the coefficients for the polynomial using multivariate regression.

15. The apparatus of claim 13 wherein the network management system is configured to admit the new communications flow in response to determining that the new communications flow is within the allocated quota of bandwidth and determining that the network would operate in the stable state.

16. The apparatus of claim 13 wherein the network management system is configured to admit the new communications flow in response to determining that the new communications flow is not within the allocated quota of bandwidth and determining that the network would operate in the stable state.

17. The apparatus of claim 13 wherein the network management system is configured to reject the new communications flow in response to determining that the new communications flow is not within the allocated quota of bandwidth and determining that the network would operate in the unstable state.

18. The apparatus of claim 13 wherein the network management system is configured to, in response to determining that the network would operate in the unstable state, determine a class that exceeds its quota of bandwidth and downgrading at least one communications flow belonging to the class that exceeds its quota of bandwidth.

19. The apparatus of claim 13 wherein the network management system is configured to in response to determining that the network would operate in the unstable state, downgrade at least one communications flow belonging to a class based on a priority of the class.

* * * * *